Feb. 17, 1970  TAKASHI FUNAKI  3,495,396
NUMERICALLY INDICATING TIMEKEEPER AND TIMER
Filed Dec. 8, 1967  6 Sheets-Sheet 1

INVENTOR.
TAKASHI FUNAKI
BY

INVENTOR.
TAKASHI FUNAKI

Feb. 17, 1970   TAKASHI FUNAKI   3,495,396
NUMERICALLY INDICATING TIMEKEEPER AND TIMER
Filed Dec. 8, 1967
FIG. 7
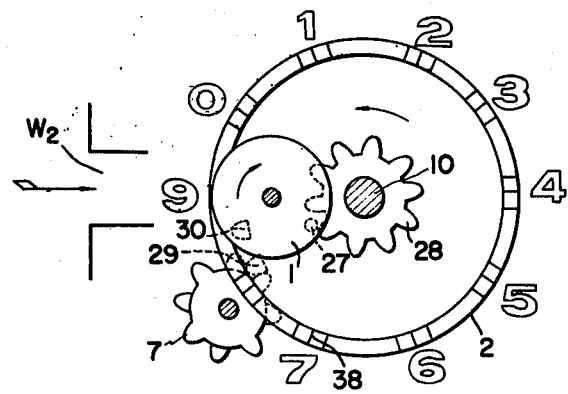
FIG. 8
(a) 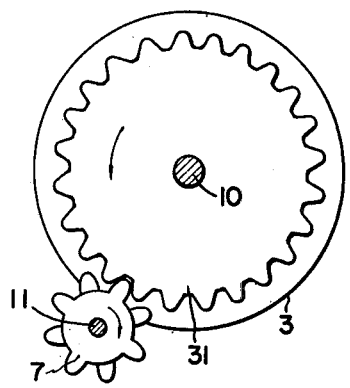   (b) 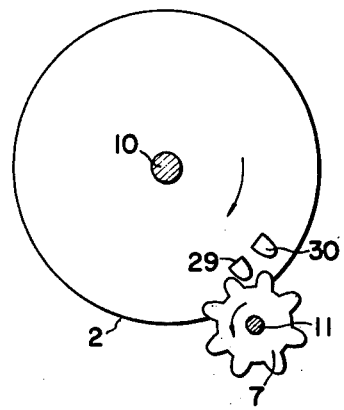
INVENTOR.
TAKASHI FUNAKI Feb. 17, 1970  TAKASHI FUNAKI  3,495,396
NUMERICALLY INDICATING TIMEKEEPER AND TIMER
Filed Dec. 8, 1967  6 Sheets-Sheet 5
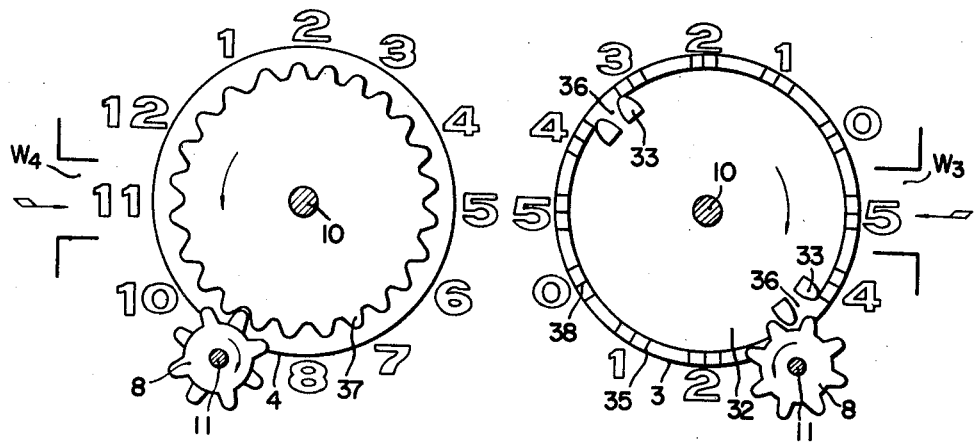
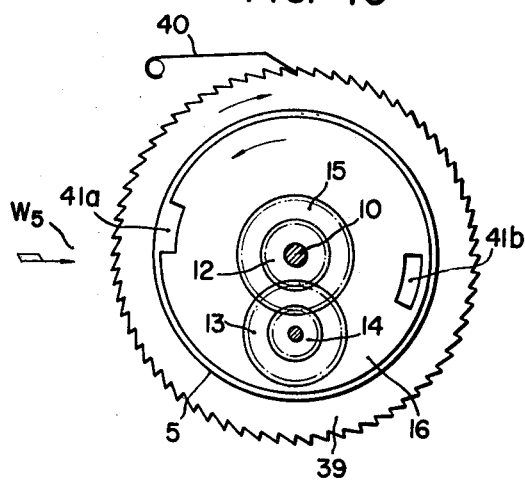
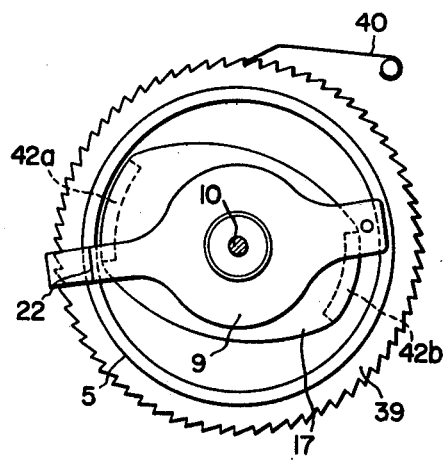
INVENTOR.
TAKASHI FUNAKI Feb. 17, 1970  TAKASHI FUNAKI  3,495,396
NUMERICALLY INDICATING TIMEKEEPER AND TIMER
Filed Dec. 8, 1967  6 Sheets-Sheet 6

INVENTOR.
TAKASHI FUNAKI
BY

United States Patent Office 3,495,396
Patented Feb. 17, 1970

3,495,396
NUMERICALLY INDICATING TIMEKEEPER AND TIMER
Takashi Funaki, Tokyo-to, Japan, assignor, by mesne assignments, to Kabushiki Kaisha Sankyo Seiki Seisakusho, Nagano-ken, Japan, a joint-stock company of Japan
Filed Dec. 8, 1967, Ser. No. 689,011
Claims priority, application Japan, Dec. 10, 1966, 41/80,953
Int. Cl. G04b 13/00; G04c 21/16
U.S. Cl. 58—19         8 Claims

ABSTRACT OF THE DISCLOSURE

A timekeeper indicating time with numerals displayed in windows is coupled through a tripping mechanism to a timer having a calibrated time setting wheel and a timer setting button for cocking a trigger mechanism. When the time as kept by the timekeeper coincides with a time preset by the timer, the tripping mechanism operates to release the trigger mechanism, which in turn operates an electric switch, an alarm, or both the switch and the alarm. The alarm can be turned off or constantly maintained inoperative, independently of the trigger mechanisms, by a manually controlled locking device.

---

Figure 1:
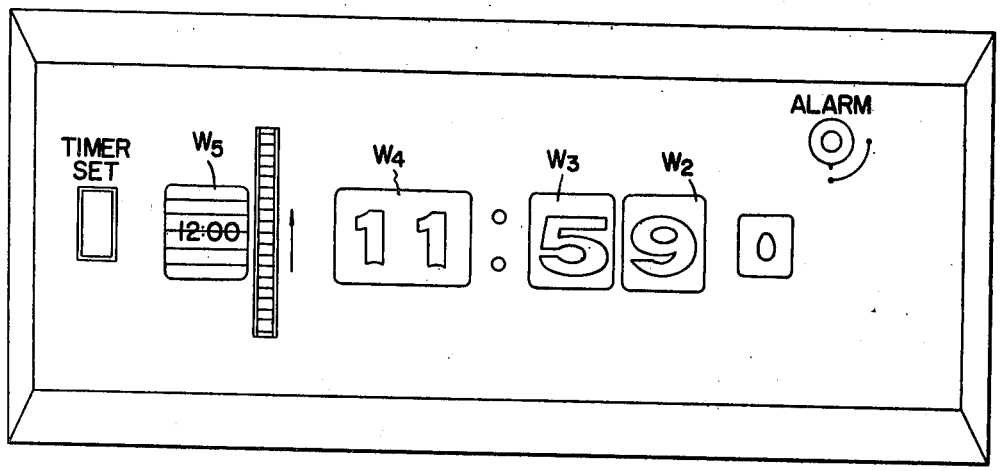

This invention relates generally to timekeepers and time switching devices and more particularly to a new timekeeper having a device for indicating time with numerals and adapted to operate a timer device for operating a switch, an alarm, or both the switch and the alarm.

Heretofore, devices of this type have had complicated mechanisms subject to malfunctioning and have tended to be bulky, and, moreover, the operations of the alarms and time switches have frequently entailed large errors.

It is an object of the present invention to overcome these difficulties.

More specifically an object of the invention, in one aspect thereof, is to provide a timekeeper having a simple device for indicating time by means of numbers, a feature of this device being a novel gear mechanism for transmitting intermittent driving power from one indicator wheel to the succeeding wheel.

Another object of the invention, in another aspect thereof, is to provide a timer device for operation in conjunction with the timekeeper to operate one or more other devices at a preset time.

Still another object of the invention is to provide a switch means operable by the above stated time setting device to provide "ON" switching, "OFF" switching, or both "ON" and "OFF" switching.

A further object of the invention is to provide an alarm device operable by the above stated time setting device to produce an alarm independently or together with the above stated switch means.

An additional object of the invention is to provide means and device as stated above which have simple, compact organization and reliable, accurate operation.

The nature, principles, details, and utility of the invention will be more clearly apparent from the following detailed description with respect to a preferred embodiment of the invention when read in conjunction with the accompanying drawings, in which like parts are designated by like reference numerals and characters.

Figure 2:
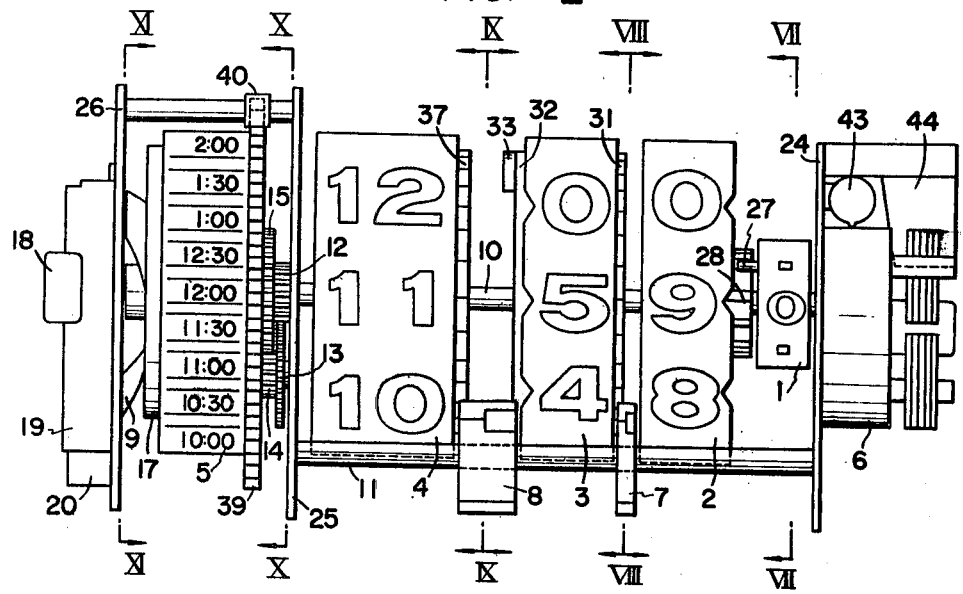
Figure 3:
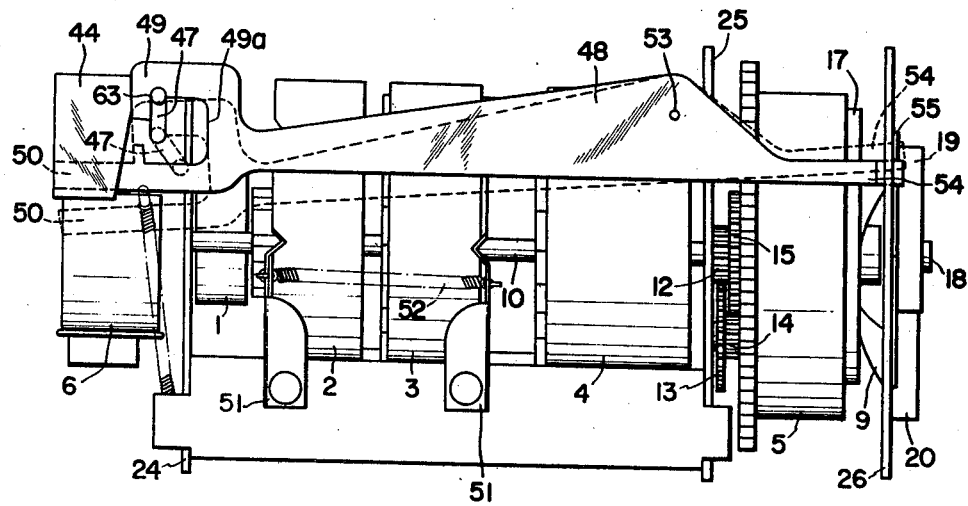
Figure 4:
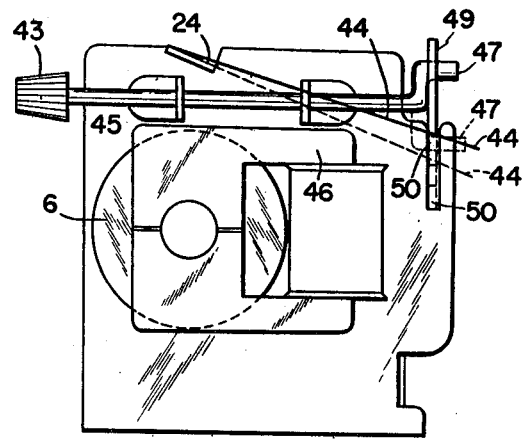
Figure 5:
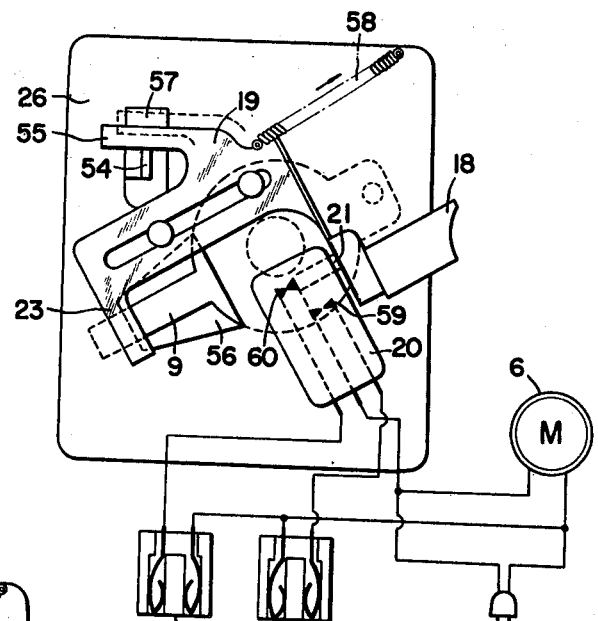
Figure 6:
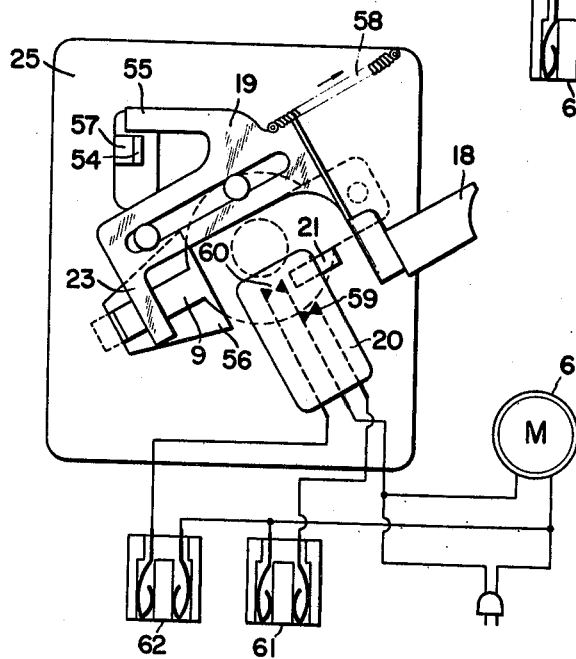
Figure 12:
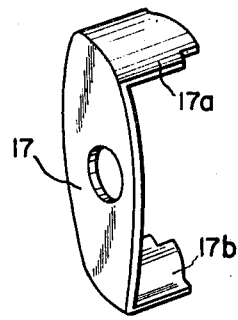
Figure 13:
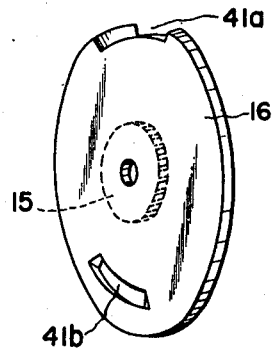
Figure 14:
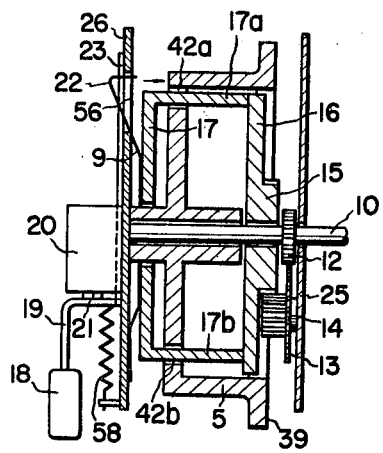
Figure 15:
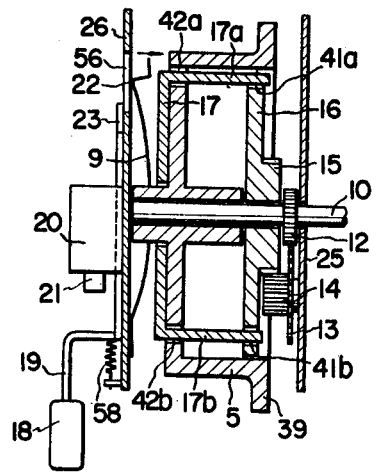
Figure 16:
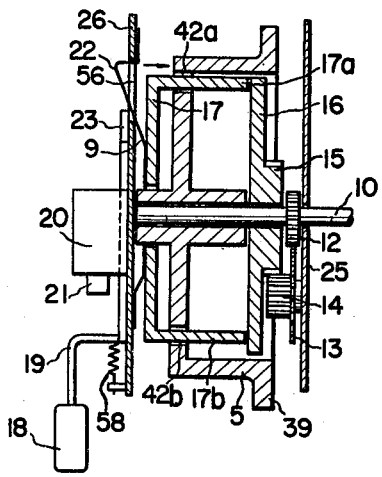

In the drawings:
FIG. 1 is a front elevation view of an example of a timekeeper embodying the invention;
FIG. 2 is a front elevation view showing the internal organization of the timekeeper shown in FIG. 1 appearing when the outer case is removed;
FIG. 3 is a rear elevation view of the assembly shown in FIG. 2;
FIG. 4 is a right side elevation view of assembly shown in FIG. 2;
FIGS. 5 and 6 are left side elevation views of the assembly shown in FIG. 2, each combined with a schematic diagram, which views indicate two operational states;
FIGS. 7, 8, 9, 10, and 11 are side elevation views respectively taken in the planes indicated by lines VII—VII, VIII—VIII, IX—IX, X—X, and XI—XI in FIG. 2 and in the arrow direction;
FIG. 12 is a perspective view of a control cam;
FIG. 13 is a perspective view of a control plate; and
FIGS. 14, 15, and 16 are plane views in horizontal section of the part between the planes indicated by lines X—X and XI—XI in FIG. 2, respectively indicating different operational states.

For consistency in designating directions, the terms "left" and "right" and related terms herein used refer to the left and right directions as viewed in FIGS. 1 and 2, that is, as viewed by an operator of the device. The terms "front" and "rear" and related terms refer respectively to the front of the entire device nearest the operator and the rear furthest from the operator.

While the present invention, in one aspect thereof, resides in the combination of a timekeeping and indicating and indicating device, a timer device, and an alarm device, the following description is divided into three sections relating respectively to these three devices.

TIMEKEEPING AND INDICATING DEVICE

Referring first to FIG. 2, the mechanism shown therein has five drums respectively bearing numerical calibrations on their peripheral surfaces and constituting indicator wheels 1, 2, 3, 4, and 5 of the following character. The second wheel 1 bears numerals indicating seconds from zero to 50 seconds. The unit-digit or first-order minute wheel 2 bears numerals indicating minutes from "0" to "9" minutes, and the ten-digit or second-order minute wheel 3 bears numerals indicating tens of seconds, which numerals are from "0" to "5" in two consecutive and identical scales. The hour wheel 4 bears numerals indicating hours from "1" to "12" hours. The time-setting wheel 5 for setting the time for an alarm and/or time switch bears numerals indicating hours from "1:00" to "12:30" hours in intervals of 30 minutes, each interval being further divided into three equal divisions which thereby represent 10-minute intervals.

The first-order minute wheel 2, the hour wheel 4, and the time-setting wheel 5 are freely rotatable about a horizontal central shaft 10 passing through their centers, and only the second-order minute wheel 3 is fixed to this shaft 10. Thus, wheels 2, 3, 4, and 5 are coaxially disposed on shaft 10. The second wheel 1 is fixed directly to the output shaft of a miniature synchronous motor 6 with a speed-reducing mechanism whereby the output shaft and the second wheel 1 rotate at a constant speed of one revolution per minute. The motor 6 is mounted on the right side of a right frame plate 24 constituting a rigid part of the frame of the entire device.

The axis of the second wheel 1 is offset from but parallel to the axis of the shaft 10. A pin 27 fixed to the inner or left side of the second wheel 1 extends toward the minute wheel 2 and is adapted to engage once every revolution with one of ten teeth of a gear 28 fixed coaxially to the minute wheel 2 thereby to rotate the minute wheel 2 through an angular displacement corresponding to one tooth of gear 28. The minute wheel 2 is thereby rotated through 1/10 of a revolution (36 degrees of angle) every minute.

The first-order minute wheel 2 is provided on its left side (opposite the side of gear 28) with two drive teeth 29 and 30 projecting horizontally toward the second-position minute wheel 3, as shown in FIG. 8(b), and adapted to mesh with an idler pinion 7 once every revolution of the minute wheel 2. The drive tooth 29 is made shorter than drive tooth 30 for the reason set forth hereinafter.

A 24-tooth gear 31 is fixed coaxially to the right side of the second-position minute wheel 3 as shown in FIG. 8(a) and is meshed with left half of the width of the pinion 7. The pinion 7 is rotatably supported on a shaft 11 parallel to shaft 10 and has an even number of teeth (eight teeth being suitable for the example illustrated for space reasons).

As indicated in FIG. 2, the right half of the gear width of pinion 7 is engageable by the drive teeth 29 and 30, while the left half is meshed with the gear 31 as mentioned above. Every other tooth of the right half of the gear width of pinion 7 is omitted, whereby the right side has four teeth, while the left side has eight teeth.

The length of drive tooth 29 is made shorter than that of drive tooth 30 as mentioned hereinabove so that it can move past the part of the pinion 7 corresponding to an omitted tooth and engage with the succeeding tooth of full gear width thereby to trip or rotate the pinion 7 through an angle corresponding to one tooth, and the following drive tooth 30 rotates the pinion 7 by an additional angle of one tooth. This organization of drive teeth 29 and 30 and pinion 7 is provided so as to prevent either of drive teeth 29 and 30 from abutting and jamming against the outer end of a tooth of pinion 7 becouse of dead-center application of force and thereby being locked.

The relationship between pinion 7 and drive tooth 29 is so preset that when the numeral "9" of minute wheel 2 appears in the sight aperture or indication window $W_2$ in the outer case, the tooth 29 is just about to engage a tooth of the pinion 7 as indicated in FIG 7. That is, as the indicated numeral shifts from "9" to "0," the pinion 7 is rotated by an angle corresponding to two teeth. Accordingly, the aforementioned gear 31 fixed to the second-order minute wheel 3 and constantly meshed with pinion 7 is driven through an angle (30 degrees) corresponding to two teeth (FIG. 8(a)). When the pinion 7 and the gear 31 have thus been rotated by two teeth, the drive tooth 30 disengages from the pinion 7, whereby the engagement relationship between the two minute wheels 2 and 3 is interrupted.

A pinion locking disk 32 is fixed coaxially to the left side of the second-position minute wheel 3 as shown in FIG. 2 and supports two pairs of teeth 33 projecting toward the hour wheel 4. The two pairs of teeth 33 are disposed near the periphery of the disk 32 in diametrically opposite positions as shown in FIG. 9. The outer peripheral surface of the pinion locking disk 32 at parts thereof other than the teeth 33 is in slidable contact with two teeth of a pinion 8 rotatably supported on the aforementioned shaft 11.

A cutout 36 is provided in the pinion locking disk 32 between the two teeth of each pair of teeth 33 as shown in FIG. 9. Accordingly, the pinion 8 can rotate only when a cutout 36 reaches the pinion 8, and a tooth of the pinion drops into this cutout 36.

Every other tooth on the right half of pinion 8 is omitted similarly as in the case of pinion 7. The locking disk 32 is so positioned relative to the second-order minute wheel 3 that when the numeral "5" of this wheel 3 just appears in the window $W_3$, one of the pairs of teeth 33 and the cutout 36 therebetween engage with a tooth of the pinion 8.

A 24-tooth gear 37 is coaxially fixed to the right side of the hour wheel 4 as shown in FIG. 2 and is constantly meshed with the pinion 8.

The operation of the timekeeping and indicating device of the above described organization may be summarized in a simple manner as follows. Referring to FIG. 2, the operation of motor 6 causes second wheel 1 to undergo one revolution per minute, and pin 27 of this second wheel 1 thereby rotates gear 28 of first-order minute wheel tooth thereof.

When numeral "9" on the minute wheel 2 appears in the window $W_2$, drive tooth 29 arrives at a position immediately prior to that of its engagement with pinion 7. Then, as minute wheel 2 rotates during the succeeding one minute, drive tooth 29 and pinion 7 engage, and pinion 7 causes gear 31 of the adjacent second-order minute wheel 3 to rotate through an angle corresponding to two teeth, that is, one scale division.

Then, when numeral "5" appears in window $W_3$ of the second-order minute wheel 3, the cutout 36 of locking disk 32 is at a position immediately in front of that of its engagement with pinion 8. As the minute wheel 3 shifts in the succeeding 10 minutes, the cutout 36 and a tooth of pinion 8 move in engaged state, whereby pinion 8 drives gear 37 of hour wheel 4 through an angle corresponding to two teeth, that is, one scale division of the hour wheel 4. In other words, since minute wheel 3 rotates through 30 degrees at each instance of movement, this movement is transmitted through pinion 8 to cause a rotation of 30 degrees also of gear 37 meshed with pinion 8, whereby the 24-tooth gear 37 is rotated by two teeth.

Thus, one revolution of the second wheel 1 causes 1/10 revolution of the first-order minute wheel 2, one revolution of which causes 1/12 revolution of the second-order wheel 3, one revolution of which causes 1/12 revolution of the hour wheel 4. As a result, the time is digitally indicated in hours, minutes, and seconds.

TIMER DEVICE

Since, as described above with reference to FIG. 2, the second-order minute wheel is fixed to the central shaft 10, this shaft 10 rotates intermittently through 30 degrees of angle in 10 minutes (one revolution in 2 hours).

A pinion 12 is fixed to the shaft 10 at a point to the left of hour wheel 4, as shown in FIG. 14, and is meshed with an idler gear 13 coaxially fixed to an idler pinion 14, which is meshed with a gear 15 fixed to a control disk 16. The control disk 16 is supported in a freely rotatable manner on the left end part of the shaft 10 and is driven intermittently by the rotation of shaft 10 transmitted through the pinion 12 and idler gears 13 and 14 to the gear 15. The gear ratios of gears 12, 13, 14, and 15 are so selected that gear 15 and control disk 16 rotate through 5 degrees of angle per 10 minutes (one revolution per 12 hours).

As illustrated in FIG. 13, the control disk 16 is provided on its outer periphery with an arcuate cutout 41a and an arcuate slot 41b which are engageable respectively with projecting cam flanges 17a and 17b of a control cam 17 as illustrated in FIG. 12, the cam flanges 17a and 17b being passed slidably through slots 42a and 42b in the time setting wheel 5 as shown in FIGS. 14 and 11. Thus, the control cam 17 can move axially relative to the time setting wheel 5 and control disk 16 but rotates together with the time setting wheel 5.

The control cam 17 is pressed rightward as indicated by an arrow in FIG. 14 by bow leaf spring 9, and the cam surfaces at the ends of the flanges 17a and 17b are constantly in contact with the left face of the control disk 16 at points thereof other than those of the cutout 41a and slot 41b at a time before a preset time, the control disk 16 then being freely rotatable. The extremities of the flanges 17a and 17b of the control cam 17 have an inclined cam surface, and the edges of the cutout 41a and slot 41b of the control disk 16 are also formed with tapered surfaces.

The time setting wheel 5 has on its right side an annular flange having a larger outer diameter than the wheel 5 and provided around its outer periphery with 72 ratchet teeth 39, which, together with a pawl 40 engaged therewith and backed by a spring, constitutes a ratchet mechanism.

The angular relationsihp between the cutout 41a and slot 41b of the control disk 16 and the flanges 17a and 17b of the control cam 17 which rotates together with the time setting wheel 5 is so set that the ends of flanges 17a and 17b engage with cutout 41a and slot 41b when the time indication appearing in the sight window $W_5$ of the time set wheel 5 coincides with the time indicated by the timekeeping device, i.e., in windows $W_4$, $W_3$, and $W_2$.

One end of the bow leaf sprng 9 is fixed to a frame plate 26 perpendicular to the shaft 10, and the other end is free and has a joggled shape with a leftward projection 22, which can pass in and out through a cutout 56 in the frame plate 26. That is, when the flanges of control cam 17 are engaged with the cutout and slot of control disk 16, the spring is deflected rightward by its elastic force, and the projection 22 is retracted out of the cutout 56 as shown in FIG. 15. When the flanges of control cam 17 are not engaged, projection 22 is projected out through the cutout 56.

On the left side of the frame plate 26, there is provided a sliding member 19 which is so supported that it can slide against the frame plate 26 in a straight line inclined approximately 35 degrees relative to the horizontal plane and extending from the upper front to the lower rear of the timer device as shown in FIGS. 15, 16, 5, and 6. The sliding member 19 is under a constant forward and upward force exterted thereon by a tension spring 58 and has a front arm supporting at its end a push button 18, which projects out of the case through an aperture.

When the push button 18 is pushed rearward and downward, a transverse arm 23 of the rear end of the sliding member 19 pushes against and slides along the projection 22 of the spring 9, countering the leftward force of the spring 9, until the arm 23 over-rides the peak of projection 22, whereupon the spring 9 springs leftward to lock the arm 23 and thereby to cock the sliding member 19 against the force of return spring 58.

When the push button 18 is thus pushed, the rear part of the front arm of the sliding member 19 simultaneously depresses the button 21 of a microswitch 20 mounted on the frame plate 26, thereby opening a contact 59 and closing a contact 60 as indicated in FIG. 5. As a result, a plug socket or receptacle 62 is turned "ON," and another receptacle 61 is turned "OFF."

The timer device of the above described organization according to the invention operates in the following manner as a time switch.

The plug of an electric power supply is plugged into either of the receptacles 61 and 62, that is, into receptacle 61 when the switch is to be closed at a specific preset time and into receptacles 62 when the switch is to be opened at a preset time. The ratchet tooth flange of the time setting wheel 5 is manually turned until the desired presetting time coincides with an indicator arrow at the window $W_5$.

With the elapse of time, central shaft 10 rotates, being driven by synchronous motor 6 as described hereinbefore. Then, at the preset time, projecting flanges 17a and 17b of control cam 17 engage with cutout 41a and slot 41b of control disk 16, and the free end of string 9 is deflected rightward as indicated in FIG. 15. Consequently, projection 22 of spring 9 is retracted rightward from cutout 56, thereby releasing the rear arm 23 of sliding member 19, which is thereby returned by spring 58. Consequently, button 21 of microswitch 20 is released and returns to its original position, whereby contact 59 is closed and contact 60 is opened as indicated in FIG. 6. That is, receptacle 61 is turned "ON" at the preset time, while receptacle 62 is turned "OFF."

As time passes, and central shaft 10 continues to rotate, the aforementioned tapered surfaces of the edges of cutout 41a and slot 41b of control disk 16 and the inclined cam surface flanges 17a and 17b of control cam 17 mutually engage and operate to force control cam 17 to move out of engagement with control disk 16 and to return to the original disengaged state thereof. Microswitch 20, however, is maintained in unchanged state. That is, as indicated in FIGS. 5 and 6, an "ON-OFF," "OFF-ON" switch is formed.

Thus, the mechanism comprising control disk 16, control cam 17, and spring 9 constitutes a tripping mechanism, and the mechanism comprising sliding member 19, spring 58, and push button 18 constitutes a trigger mechanism which can be manually cocked and automatically released by the tripping mechanism.

Cutout 41a and slot 41b of control disk 16 and flanges 17a and 17b of control cam 17 are provided at two diametrically opposite positions for the purpose of causing the force of spring 9 to be imparted evenly on control disk 16.

ALARM DEVICE

The principal components of the alarm device are a buzzer, a first mechanism operable by the timer device to place the buzzer in inoperative state and subsequently to operate the buzzer at a preset time, and a manually operated locking mechanism for locking and unlocking the buzzer.

The buzzer comprises essentially of the core 46 of the aforementioned miniature synchronous motor 6 for driving the second wheel 1 and a steel leaf vibrator 44 fixed at one end to a rigid bracket part of the frame plate 24. Thus, the core 46 of the motor 6 is utilized doubly as a motor core and as a driving power means for the buzzer.

The above described buzzer is placed in operative or inoperative state by either of the above mentioned mechanisms for controlling the buzzer, which are interlocked in that the locking of the locking mechanism renders the first mechanism inoperative.

In the illustrated example, the locking mechanism for locking and unlocking the buzzer comprises a torque shaft 45 extending horizontally from front to rear and rotatably supported on the right side of the frame plate 24 and a knob 43 fixed to the front end of the torque shaft 45 and disposed outside of the case. The shaft 45 has a rear end which is joggled to form a crank 47, the crankpin part of which is rotatable in a cutout 49a near the right end 49 of a lock lever 48 pivoted at an intermediate part thereof on a pivot 53. The extreme right end of the lock lever 48 is an extension 50 in contact with lower surface of the leaf vibrator 44 near its free end.

When the end 49 of the lever 48 is at its highest position as shown by full line in FIG. 3, the extension 50 is upwardly bending and holding the vibrator 44 off and apart from the core 46 of the motor 6 at a distance sufficient to prevent the vibrator 44 from vibrating in synchronism with the frequency of the A.C. power supplied to the core 46; and when the end 49 is at its lowest position as indicated by intermittent line, the extension 50 is separated downward from the vibrator 44, which is then in undeflected, free state for vibration and emission of sound.

When the crank 47 is in its unlocking or lowered position as indicated by intermittent line in FIG. 3, it has no influence on the operation of lock lever 48. When the knob 43 is manually turned clockwise (as viewed from the front side), the crankpin part of crank 47 acts upward on the upper edge of cutout 49a (if the lock lever 48 is in lowered position) to raise the end 49 of the lever 48 until the crankpin part clicks into a lock recess 63 at the right side of the upper edge of cutout 49a. The right end 49 of lever 48 is then locked in its highest position and can be unlocked and released only by turning the knob 43 in the counterclockwise direction to its original position.

The lock lever 48 also constitutes a part of the above mentioned first mechanism for placing the buzzer in inoperative state and then to operate the buzzer at a preset time. The left end 54 of this lever 48 projects through and leftward beyond an opening 57 in the left frame plate 25 as shown in FIGS. 5 and 6 and is engageably from above by an arm 55 of the sliding member 19 of the time switch device. When the push button 18 is depressed, the sliding member 19 moves downward and rearward toward the position indicated in FIG. 5, whereby the arm 55 depresses the left end 54 of the lock lever 48.

FIG. 6 indicates the state of this mechanism when the sliding members 19 has been released to return to its original position, and the arm 55 has released the end 54. The pivot 53 of the lock lever 48 is placed nearer the left end of the lever than the right end. Accordingly, the resulting moment due to gravity on the lever 48 tends to lower the right end 49 when the lever is free. An additional downward force is imparted by the reaction force of the deflected vibrator 44 to the right end 49 when the right end is raised.

The alarm device of the above described organization operates in the following manner. The reading on the time setting wheel 5 is manually set at a desired time (to the nearest ten minutes), and push button 18 is manually depressed to cause arm 55 to depress left end 54 of lock lever 48, as shown in FIG. 5. At this time, the locking mechanism is placed in its unlocking state whereby right end 49 of lever 48 is free of crank 47, and lock lever 48 is initially in a free state. The right end 49 of lever 48 is thereby raised to the position indicated by full line in FIG. 3, whereupon leaf vibrator 44 is seld inoperative.

At the preset time, sliding member 19 is released and returns as indicated in FIG. 6 and as described hereinbefore with respect to the time switch device. Consequently, arm 55 rises and releases left end 54 of lock lever 48, which thereby rotates about its pivot 53 to its free position whereby extension 50 releases vibrator 44. The vibrator 44 is thereby placed in a position to be activated by motor core 46 to produce an alarm sound.

To stop the alarm, the knob 43 is turned clockwise, whereby the crankpin of crank 47 raises right end 49 of lock lever 48 and clicks into place in recess 63, and vibrator 44 is thereby locked.

As described above, the present invention provides a timekeeper including a time indicating device which indicates time with numerals and is adapted to operate a timer device for operating a switch, an alarm device, or both the switch and the alarm device. Moreover, the combination of the timekeeper and the devices operable thereby are of relatively simple and compact organization and have an accurate and reliable operation with low probability of malfunctioning.

What I claim is:
1. In a timekeeper of the type wherein time is indicated by numerals inscribed on and constituting divisions of scales respectively on a second wheel (1) rotated through one revolution per minute by a motor (6), a first-order minute wheel (2), a second-order minute wheel (3), and an hour wheel (4) all in positional notation order, the combination thereof with first and second means respectively for causing said second-order minute wheel and said hour wheel to be rotated through one scale division respectively by one revolution of said first-order minute wheel and by one revolution of the second-order minute wheel, each of said first and second means comprising a gear (31 or 37) fixed coaxially to the higher-order wheel 3 or 4), an idler pinion (7 or 8) having an even number of teeth on one half of its width of gear face and meshed at said half with said gear, every other tooth on the other half of the width of gear face being non-existent, whereby the number of teeth on said other half is one half of said even number, first and second drive gear teeth (29, 30 or 36, 33) fixed to the lower-order wheel (2 or 3) in mutually spaced-apart positions to engage in succession the pinion at said other half once every revolution of said lower-order wheel, the addendum of said first drive gear tooth to engage the pinion first being less than that of said second drive gear tooth thereby to trip the pinion and prevent jamming.

2. A time device comprising, in combination:
(a) a timekeeper comprising, in combination,
a motor (6),
a second wheel (1) rotated through one revolution per minute by said motor and bearing a scale of numerals indicating seconds,
a first-order minute wheel (2) bearing a scale of numerals establishing divisions thereof in units of minutes and rotated through one of said units divisions by one revolution of said second wheel,
a second-order minute wheel (3) bearing a scale of numerals establishing divisions thereof in tens of minutes,
an hour wheel (4) bearing a scale of numerals indicating divisions of hours,
all of said wheels being in positional notation order,
a central shaft (10) fixed coaxially to said second-order minute wheel and rotatably and coaxially supporting said first-order minute wheel and said hour wheel,
first means for causing the second-order minute wheel to be rotated through one scale division thereof by one revolution of the first-order minute wheel, and
second means for causing the hour wheel to be rotated through one scale division by one revolution of the second-order minute wheel,
each of said first and second means comprising a gear (31 or 37) fixedly coaxially to the high-order wheel (3 or 4),
an idler pinion (7 or 8) having an even number of teeth one half of its width of gear face and meshed at said one half with said gear,
every other tooth on the other half of the width of gear face being non-existent, whereby the number of teeth on said other half is one half of said even number, and
first and second drive gear teeth (29, 30 or 36, 33) fixed to the lower-order wheel (2 or 3) in mutually spaced-apart positions to engage in succession the pinion at said other half once every revolution of said lower-order wheel,
the addendum of said first drive gear tooth to engage the pinion first being less than that of said second drive gear tooth thereby to trip the pinion and prevent jamming;
(b) a timer device comprising,
a time setting wheel (5) bearing a scale calibrated to indicate set time and adapted to be rotatably adjusted and held at any desired time setting position,
tripping means coupled to said central shaft and to said time setting wheel and accomplishing automatic tripping action at the instant when the rotational position of the central shaft coincides with a set rotational position of the time setting wheel, and
trigger means manually cocked and subsequently released automatically by said tripping action; and
(c) time-activatable means activated by said trigger means upon release thereof to perform a desired operation at the time set by the time setting wheel.

3. The time device as claimed in claim 2 in which said time-activatable means is at least one electric switch.

4. The time device as claimed in claim 2 in which said time-activatable means is at least one alarm device provided with manually operable means for rendering inoperative said alarm device.

5. The time device as claimed in claim 4 in which the alarm device comprises a buzzer vibrator supported in a position to be activated when free by the core (46) of said motor (6), a mechanism actuated by said trigger means upon cocking and subsequent releasing thereof to accomplish, respectively, locking and unlocking of said buzzer vibrator thereby to render the same inoperative and subsequently operative at said time set by the time setting wheel, and locking means manually operated to actuate said mechanism to cause the same to accomplish said locking independently of the trigger means.

6. The time device as claimed in claim 2 in which the second-order wheel bears in consecutive sequence at equal intervals around its periphery the numerals 0, 1, 2, 3, 4, 5, 0, 1, 2, 3, 4, and 5 for designating tens of minutes.

7. The time device as claimed in claim 2 in which said time-activatable means comprises at least one electric switch and at least one alarm device, said alarm device being provided with manually operated means for rendering inoperative said alarm device but permitting operation of said electric switch.

8. The time device as claimed in claim 7 in which the alarm device comprises a buzzer vibrator supported in a position to be activated when free by the core (46) of said motor (6), a mechanism actuated by said trigger means upon cocking and subsequent releasing thereof to accomplish, respectively, locking and unlocking of said vibrator thereby to render the same inoperative and subsequently operative at said time set by the time setting wheel, and locking means manually operated to actuate said mechanism to cause the same to accomplish said locking independently of the trigger means.

References Cited

UNITED STATES PATENTS

| | | | |
|---|---|---|---|
| 2,343,613 | 3/1944 | Goldsmith | 58—125 |
| 2,539,138 | 1/1951 | Johnson | 58—19 |
| 2,768,332 | 10/1956 | Protzmann et al. | 58—20 |
| 2,926,486 | 3/1960 | Graves | 58—21 |

FOREIGN PATENTS 76,404  9/1961  France.
(Addition to No. 1,218,650)

RICHARD B. WILKINSON, Primary Examiner

L. R. FRANKLIN, Assistant Examiner

U.S. Cl. X.R.

58—21.1, 125; 235—133